April 11, 1933. H. OEHME 1,903,472
PROCESS FOR THE EXTRACTION OF ETHYLENE GLYCOL OR ITS HOMOLOGUES
Filed June 17, 1930
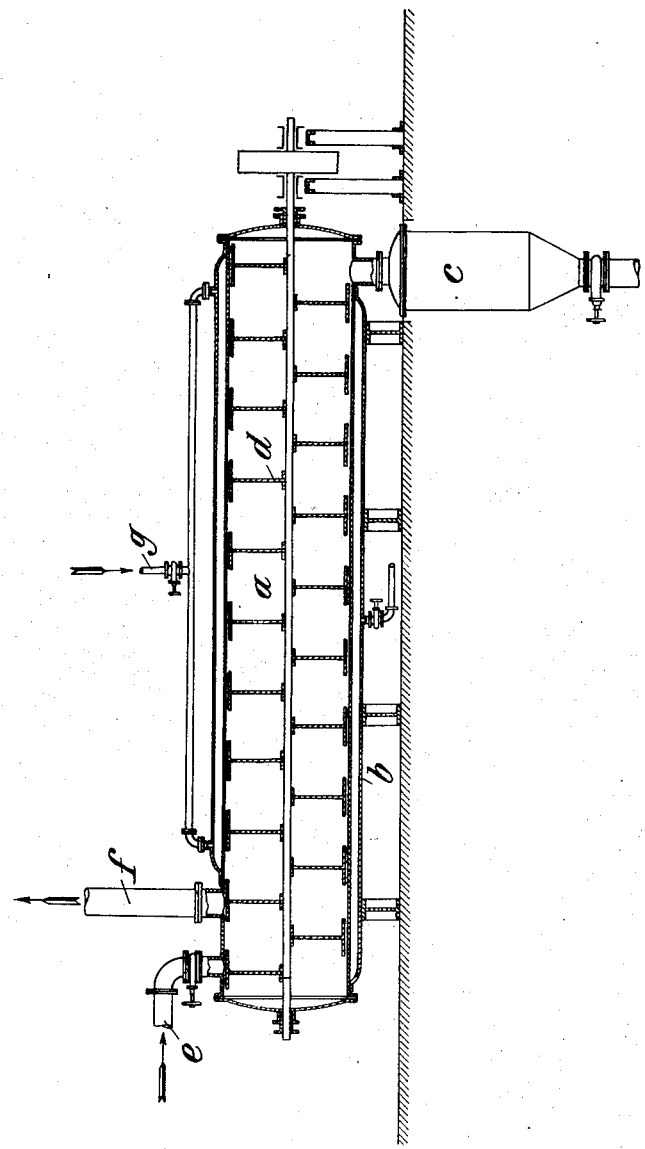
Inventor:
Hermann Oehme
By
Attorney Patented Apr. 11, 1933

1,903,472

UNITED STATES PATENT OFFICE

HERMANN OEHME, OF COLOGNE, GERMANY, ASSIGNOR TO CHEMISCHE FABRIK KALK GESELLSCHAFT MIT BESCHRÄNKTER HAFTUNG, OF COLOGNE-KALK, GERMANY

PROCESS FOR THE EXTRACTION OF ETHYLENE GLYCOL OR ITS HOMOLOGUES

Application filed June 17, 1930, Serial No. 461,759, and in Germany April 30, 1930.

It is known to produce glycol or the like from olefine-chlorides by saponification by means of alkaline carbonates. These means are, however, expensive, so that the saponification by means of alkaline carbonates has been replaced by a saponification by means of alkaline earth carbonates. The separation of glycol from the alkaline earth chloride solution so produced may be effected by using vacuum and/or water vapour. The usual vacuum distillation does not however suit the purpose and gives an unsatisfactory yield and when using water vapour at the same time, diluted glycol solutions are obtained which must be distilled again, thus increasing the expenses of the process.

It has been now ascertained that glycol can be extracted from solutions containing calcium chloride or magnesium chloride by vacuum distillation alone without using water vapour if the temperature in the vacuum is increased very considerably up to 250–400° C. and if provision is made by vigorous stirring or distribution in a thin layer or by other suitable means for the mass to be continually in motion whereby the separation of the glycol from the calcium chloride or magnesium chloride is facilitated. Addition compounds are probably formed between the glycol and calcium chloride or magnesium chloride, which are split by the simultaneous mechanical treatment in vacuum and at high temperatures which lie above the boiling point of the glycol in vacuum.

It would have been expected that the glycol would be considerably decomposed in vacuum at such high temperatures which unexpectedly is not the case, for it has been shown that glycol can be distilled from solutions containing calcium chloride or magnesium chloride with only a small loss by using vacuum in iron apparatus at a high temperature and with vigorous mechanical treatment, and that after separating the glycol a powdery anhydrous calcium chloride is left which has a special technical value. The process can also be so carried out that the glycol-calcium chloride solution is passed into a thin layer vacuum drier the drum of which is heated to about 300–320° C.

Another method of carrying out the process consists in that the solid glycol-calcium chloride addition compound, obtained from the glycol calcium chloride solution by heating in a thin layer vacuum drier to 170° C., which almost completely drives off the water contained in the solution is liquefied by the addition of heated glycol and this liquid is then heated in a second thin layer vacuum drier to about 320° C. in order to quantitatively separate the glycol.

Further experiments have shown that this process can not only be carried out intermittently but also continuously with better results. It has been shown that the extraordinary consumption of energy which is necessary in the intermittent operation during one phase of the distillation in which the mixture of calcium chloride or magnesium chloride and glycol assumes a cement-like consistency disappears, and that the separation of the glycol and calcium chloride or magnesium chloride proceeds with small consumption of energy and that quite an excellent yield when as noted the process is carried on continuously. It is particularly surprising that in the continuous process the temperature which is necessary for separating the last traces of glycol from the calcium chloride remains under 300° C. with a good vacuum, whilst with the intermittent process the temperature must be increased to 350–400° C. in order to drive off the last traces of glycol. For these reasons the yield is therefore better with the continuous process than with the intermittent process.

Cylindrical vacuum distillation apparatus provided with agitators or other mixing means are specially suited to carrying out the distillation.

The drawing affixed hereto illustrates diagrammatically an embodiment of my invention. In the drawing is: $a$ a horizontal cylinder fitted with an agitator $d$. The cylinder is provided with a heating jacket $b$. A box $c$ is intended for collecting the calcium chloride freed from glycol. $e$ is a feed pipe for the solution containing glycol and calcium chloride. $f$ is a pipe connected with a vacuum pump, not shown. The steam generated in the cylinder is also drawn off through pipe *f*. *g* is a pipe by which superheated steam is admitted to the heating jacket *b* of the cylinder *a*.

Various changes and modifications may be made in my device without departing from the spirit of my invention.

I claim as my invention:—

1. A process for the extraction of ethylene glycol from an aqueous solution containing a metal chloride comprising agitating the solution in vacuum at temperatures between 250–400° C.

2. A process according to claim 1 in which the distillation of the aqueous glycol-chloride solution is carried out in a thin layer vacuum drier at a temperature of 200–320° C.

3. A process according to claim 1 in which the distillation of the aqueous glycol-chloride solution is carried out in a thin layer vacuum drier at a temperature of 200–320° C. and the water is completely driven off from the aqueous solution in the drier at a temperature of approximately 170° C.

4. A process according to claim 1 in which the distillation of the aqueous glycol-chloride solution is carried out in a thin layer vacuum drier at a temperature of 200–320° C. and the water is completely driven off from the aqueous solution in the drier at a temperature of approximately 170° C., the solid anhydrous glycol compound being dissolved in hot glycol and the glycol is then driven off at a temperature of approximately 320° C. in the thin layer vacuum drier.

In testimony whereof I affix my signature.

HERMANN OEHME.